US011216516B2

(12) United States Patent
Yen et al.

(10) Patent No.: US 11,216,516 B2
(45) Date of Patent: Jan. 4, 2022

(54) METHOD AND SYSTEM FOR SCALABLE SEARCH USING MICROSERVICE AND CLOUD BASED SEARCH WITH RECORDS INDEXES

(71) Applicant: AT&T Intellectual Property I, L.P., Atlanta, GA (US)

(72) Inventors: Wei Yen, Atlanta, GA (US); Olgica Hea, St. Louis, MO (US); Seyed Hashemi, Johns Creek, GA (US); Linda Silence, Sammamish, WA (US); Paul DePalma, Sugar Hill, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 396 days.

(21) Appl. No.: 16/003,735

(22) Filed: Jun. 8, 2018

(65) Prior Publication Data
US 2019/0377827 A1 Dec. 12, 2019

(51) Int. Cl.
*G06F 16/00* (2019.01)
*G06F 16/9535* (2019.01)
(Continued)

(52) U.S. Cl.
CPC ......... *G06F 16/9535* (2019.01); *G06F 16/22* (2019.01); *G06F 16/2379* (2019.01); *G06F 16/284* (2019.01)

(58) Field of Classification Search
None
See application file for complete search history.

(56) References Cited

U.S. PATENT DOCUMENTS 7,698,282 B2  4/2010 Subramaniam et al.
7,702,614 B1  4/2010 Shah et al.
(Continued)

FOREIGN PATENT DOCUMENTS

WO  WO2014180411  11/2014
WO  WO2017054543  4/2017
WO  WO2018031562  2/2018

OTHER PUBLICATIONS

Ichikawa et al., "Distributed Search Engine for an IaaS based Cloud", 2011 International Conference on Broadband and Wireless Computing, Communication and Applications, 2011, 34-39.
(Continued)

*Primary Examiner* — Debbie M Le
(74) *Attorney, Agent, or Firm* — Guntin & Gust, PLC; Dana Lemoine (57) ABSTRACT

A method for searching for information in a relational database includes: identifying a subset of attributes from attributes for each record in the relational database, the subset of attributes including a plurality of search attributes and a plurality of search summary attributes; extracting the subset of identified attributes from each record; creating in a cloud-based non-relational database platform an index instance corresponding to each record in the relational database, wherein each index instance in the cloud-based non-relational database includes the subset of identified attributes indexed to a corresponding record in the relational database; and in response to receiving a search request that includes one or more search attributes, searching the index instances in the cloud-based non-relational database for corresponding records in the relational database; and providing search results that include information from corresponding records in the relational database, wherein the
(Continued)

US 11,216,516 B2

Page 2 information is associated with the plurality of search summary attributes.

20 Claims, 5 Drawing Sheets

(51) Int. Cl.
*G06F 16/22* (2019.01)
*G06F 16/28* (2019.01)
*G06F 16/23* (2019.01)

(56) References Cited

U.S. PATENT DOCUMENTS

| | | | |
|---|---|---|---|
| 7,836,043 B2 | 11/2010 | Jensen et al. | |
| 8,095,500 B2 | 1/2012 | Bermeister et al. | |
| 8,219,544 B2 | 7/2012 | Bluger et al. | |
| 8,468,146 B2* | 6/2013 | Bhose | G06F 16/951 |
| | | | 707/711 |
| 8,612,423 B2 | 12/2013 | Nath et al. | |
| 8,667,456 B1 | 3/2014 | Czymontek | |
| 8,977,717 B2 | 3/2015 | Aarni et al. | |
| 9,135,342 B2 | 9/2015 | Cui | |
| 9,282,168 B2 | 3/2016 | Prahlad | |
| 9,613,108 B1* | 4/2017 | Kennedy, Jr. | G06F 16/25 |
| 9,633,074 B1* | 4/2017 | Sharma | G06F 16/245 |
| 9,716,617 B1* | 7/2017 | Ahuja | H04L 63/20 |
| 9,886,441 B2 | 2/2018 | Bhagat et al. | |
| 10,452,624 B2* | 10/2019 | Broch | G06F 3/0604 |
| 10,963,525 B2* | 3/2021 | Nishant | G06F 16/9535 |
| 2008/0033943 A1 | 2/2008 | Richards et al. | |
| 2009/0063448 A1 | 3/2009 | DePue et al. | |
| 2015/0112996 A1 | 4/2015 | Mishra et al. | |
| 2015/0154259 A1* | 6/2015 | Keeton | G06F 16/2282 |
| | | | 707/769 |
| 2015/0248435 A1 | 9/2015 | Solheim et al. | |
| 2016/0055248 A1 | 2/2016 | Goel et al. | |
| 2016/0188710 A1* | 6/2016 | Dulba Naik | G06F 16/214 |
| | | | 707/737 |
| 2016/0203174 A1 | 7/2016 | Shahane et al. | |
| 2016/0321264 A1 | 11/2016 | Neagovici-Negoescu et al. | |
| 2017/0032136 A1 | 2/2017 | Gangadharappa et al. | |
| 2017/0147652 A1 | 5/2017 | Kuo et al. | |
| 2019/0303481 A1* | 10/2019 | Jiang | G06F 16/28 |

OTHER PUBLICATIONS

Lagerspetz et al., "Mobile Search and the Cloud: The Benefits of Offloading", 1st IEEE PerCom Workshop on Pervasive Communities and Service Clouds, 2011, 117-122.

Lindemann et al., "A Distributed Search Service for Peer-to-Peer File Sharing in Mobile Applications", Proceedings of the Second International Conference on Peer-to-Peer Computing, 2002.

Zhang et al., "An Efficient Multi-Dimensional Index for Cloud Data Management", 2009, 17-24.

* cited by examiner

Search Criteria

| ATTRIBUTE5 |
|---|
| ATTRIBUTE9 |
| ATTRIBUTE12 |

| ATTRIBUTE1 | ATTRIBUTE5 | ATTRIBUTE10 | ATTRIBUTE12 | ATTRIBUTE16 |
|---|---|---|---|---|
| RECORD A | DATA5 | DATA10 | DATA12 | DATA16 |
| RECORD B | DATA5 | DATA10 | DATA12 | DATA16 |
| RECORD C | DATA5 | DATA10 | DATA12 | DATA16 |

355 — ATTRIBUTE1 row
360 — RECORD A row
365 — RECORD B row

METHOD AND SYSTEM FOR SCALABLE SEARCH USING MICROSERVICE AND CLOUD BASED SEARCH WITH RECORDS INDEXES

BACKGROUND

Unless otherwise indicated herein, the materials described in this section are not prior art to the claims in this application and are not admitted to be prior art by inclusion in this section.

A relational database is a collection of data items organized as a set of formally-described tables from which data can be accessed or reassembled in many different ways without having to reorganize the database tables. A database may be a repository for storing, managing, and distributing electronic data, and may store any of the data resources produced and/or utilized by an individual and/or an organization. Data resources may include files, documents, records, user profiles, etc., or portions thereof.

Performance is critical to user experience of a search application because the user often needs to find the records of interest quickly, for example in a customer service scenario, when interacting with the system. However, system performance degrades with a conventional database as the volume of stored records grows and the search criteria increase in both quantity and complexity. Eventually, a search query may either take a long time to return the result or timeout with no result at all. Adding restrictions in search parameters, reorganizing database tables, or maintaining the record volume may temporarily mitigate the issue. These measures, however, are not always plausible or do not solve the long term problem.

SUMMARY

Systems and methods for scalable search using microservice and cloud based search with records indexes are provided.

According to various aspects there is provided a method for searching for information maintained in a relational database. In some aspects, the method may include: identifying a subset of attributes from a total number of attributes for each record in the relational database, wherein the subset of attributes may include a plurality of search attributes and a plurality of search summary attributes; extracting the subset of identified attributes from each record in the relational database; creating in a cloud-based non-relational database platform an index instance corresponding to each record in the relational database, wherein each index instance in the cloud-based non-relational database platform may include the subset of identified attributes indexed to a corresponding record in the relational database; and in response to receiving a search request that includes one or more search attributes, searching the index instances in the cloud-based non-relational database platform for corresponding records in the relational database; and providing search results that include information from corresponding records in the relational database. The information may be associated with the plurality of search summary attributes.

The method may further include: determining whether a user-generated search request includes a record ID; when the user-generated search request includes a record ID, searching the relational database; and when the user-generated search request includes the one or more search attributes, then generating the search request and directing the search request to the cloud-based non-relational database platform.

The method may further include: identifying an additional search attribute from the total number of attributes for each record in the relational database; adding the additional search attribute to the plurality of search attributes and the subset of identified attributes; and modifying the index instances in the cloud-based non-relational database platform to add the additional search attribute.

The method may further include: determining whether the additional search attribute is an attribute updated more frequently than a periodic update of the relational database; and in response to determining that the additional search attribute is an attribute updated more frequently than a periodic update of the relational database, preventing modification of the index instances in the cloud-based non-relational database platform to add the additional search attribute. When the cloud-based non-relational database platform is not modified to add the additional search attribute, the method may further include performing a search for records containing the additional search attribute in the relational database based on the search results from the search of the cloud-based non-relational database.

The method may further include: performing a subsequent search of the relational database based on the record IDs returned in the search results summary for the search in the cloud-based non-relational database platform.

According to various aspects there is provided a system for searching for information maintained in a relational database platform. In some aspects, the system may include: a relational database platform configured to store a plurality of records containing a plurality of attributes; a cloud-based non-relational database platform configured to store a plurality of index instances, each of the plurality of index instances corresponding to one of the plurality of records and containing a subset of attributes from a total number of attributes for each of the plurality of record, wherein the subset of attributes may include a plurality of search attributes and a plurality of search summary attributes; a backend processor configured to extract the subset of attributes from each record in the relational database; and a microservice residing in the cloud configured to create in the cloud-based non-relational database platform the plurality of index instances. In response to receiving a search request that includes one or more search attributes, the backend processor causes the microservice to search the index instances in the cloud-based non-relational database platform for corresponding records in the relational database; and the microservice provides search results that include information from corresponding records in the relational database. The information may be associated with the plurality of search summary attributes.

The backend processor may be further configured to: determine whether a user-generated search request includes a record ID as a search request attribute; in response to determining that the user-generated search request includes a record ID, search the relational database for a corresponding record; and in response to determining that the user-generated search request includes the one or more search attributes other than the record ID, generate the search request and direct the search request to the microservice to search the cloud-based non-relational database platform.

The backend processor may be further configured to: identify an additional search attribute from the total number of attributes for each record in the relational database; add the additional search attribute to the plurality of search attributes and the subset of identified attributes; and communicate instructions to the microservice to modify the index instances in the cloud-based non-relational database platform to add the additional search attribute.

The backend processor may be further configured to: identify an additional search attribute from the total number of attributes for each record in the relational database; determine whether the additional search attribute is an attribute updated more frequently than a periodic update of the relational database; and in response to determining that the additional search attribute is an attribute updated more frequently than a periodic update of the relational database, communicate instructions to the microservice to maintain the index instances in the cloud-based non-relational database platform to include the subset of add the additional search attributes. When the cloud-based non-relational database platform is not modified to add the additional search attribute, the backend processor may be further configured to perform a search for records containing the additional search attribute in the relational database based on the search results communicated by the microservice to the backend processor from the search of the cloud-based non-relational database.

The backend processor may be further configured to: perform a subsequent search of the relational database based on the record IDs returned in the search results summary by the microservice for the search in the cloud-based non-relational database platform.

According to various aspects there is provided a method for searching for information maintained in a relational database. In some aspects, the method may include: creating in a non-relational database in a cloud-based search platform an index instance corresponding to each record in the relational database, wherein each index instance in the non-relational database may include a subset of identified attributes from attributes for each record, each index instance indexed to a corresponding record in the relational database; receiving a search request for the relational database, the search request including one or more attributes from the subset of identified attributes; redirecting the search request to the non-relational database; performing a search in the non-relational database based on the attributes included in the search request; and returning a search results summary from the search in the non-relational database. The search results summary may include record IDs and attributes for one or more index instances corresponding to one or more records in the relational database.

The method may further include: preselecting from the subset of identified attributes the one or more attributes returned in the search results summary. One or more of the attributes returned in the search results summary may be different than the attributes included in the search request.

The method may further include: reformatting the redirected search request to provide instructions compatible with the non-relational database in the cloud-based search platform, and formatting the search results summary returned from the non-relational database similarly to search results returned from a search of the relational database.

The method may further include: performing a subsequent search of the relational database based on the record IDs returned in the search results summary for the search in the non-relational database.

The method may further include: identifying, from the attributes for the records in the relational database, an additional search attribute not included in the subset of identified attributes; and modifying the index instances in the non-relational database to include the additional search attribute.

The method may further include: identifying, from the attributes for the records in the relational database, an additional search attribute not included in the subset of identified attributes; and performing a subsequent search in the relational database for records containing the additional search attribute in the relational database based on the search results summary from the non-relational database search.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In accordance with various aspects of the present disclosure, systems and methods for scalable search using a microservice and cloud based search platform with records indexes are provided. A cloud-based search platform, for example, the Elasticsearch® platform or another cloud-based search platform, may contain index instances in a non-relational database that are indexed to records contained in a relational database. A search microservice may receive search queries directed to the relational database that have been redirected to search the index instances contained in the non-relational database. The microservice may return a search results summary from a search of the index instances in the non-relational database that identify the records in the relational database matching the search query.

Figure 1:
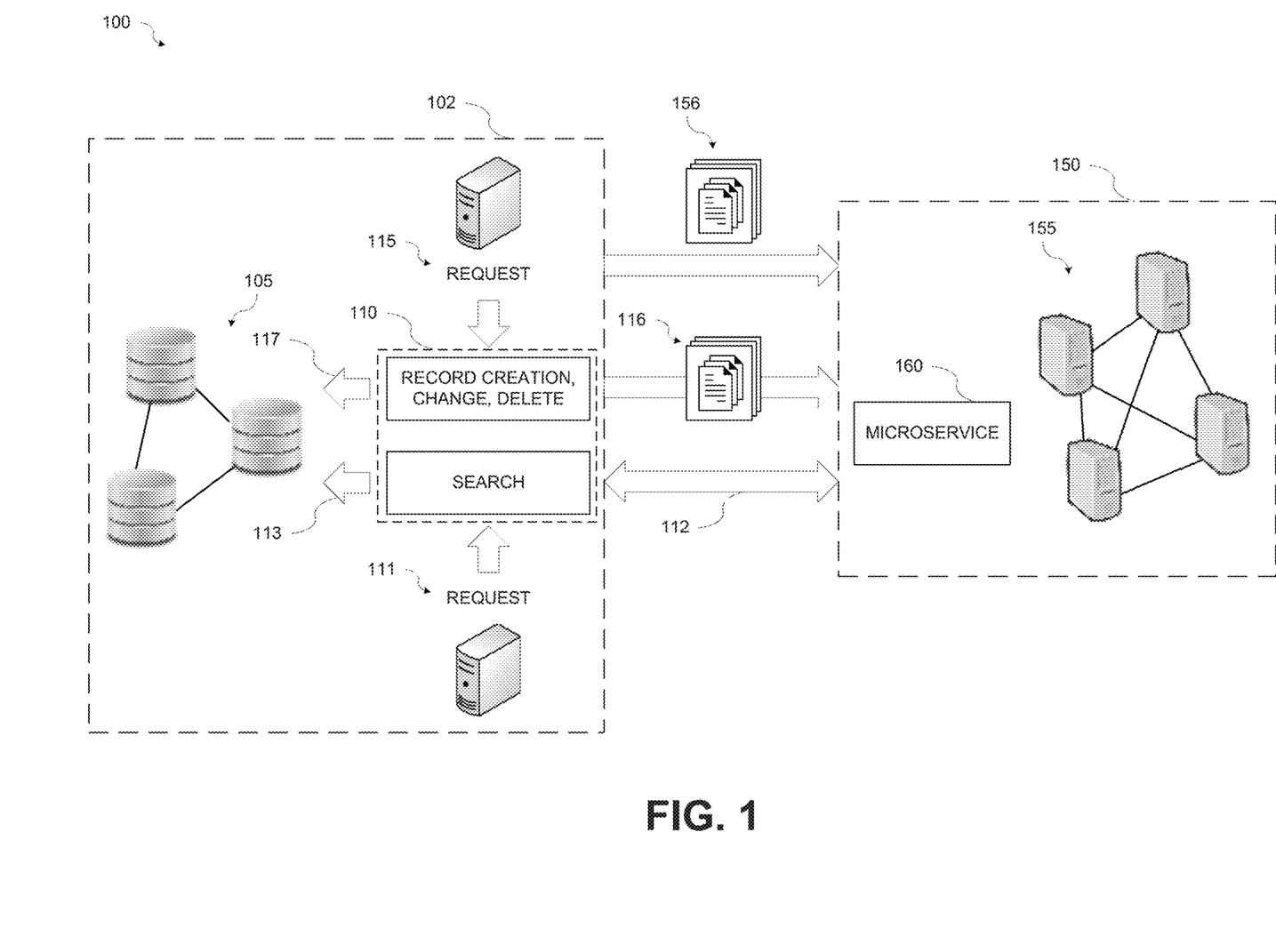
FIG. 1 is a block diagram of a system for scalable search using a microservice and cloud based search platform with records indexes according to various aspects of the present disclosure.

FIG. 1 is a block diagram of a system 100 for scalable search using a microservice and cloud based search platform with records indexes according to various embodiments. As illustrated in FIG. 1, the system 100 may include a computing system 102 including a relational database 105, a backend processor 110, a search microservice 160, and a cloud-based search platform 150. The cloud-based search platform 150 may include a non-relational database 155. The non-relational database 155 may be a cloud-based distributed database. The non-relational database 155 may contain index instances 156 of records in the relational database 105. The non-relational database 155 may initially be created based on a subset of a total number of attributes contained in each of the plurality of records maintained in the relational database 105 by any suitable programming method, for example, but not limited to data movement as a platform (DMaaP), as will be understood by those of ordinary skill in the art.

Figure 2A:
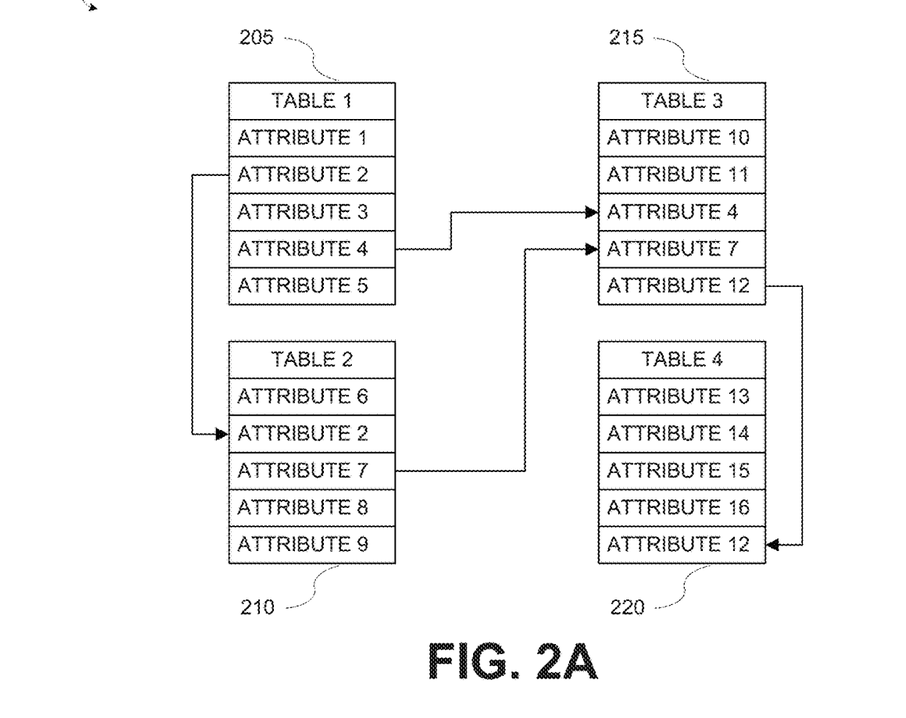
FIG. 2A is a representative diagram of a record in the relational database.

The non-relational database 155 may reside in the cloud and may contain a plurality of index instances, each index instance being indexed to one of a plurality of records maintained in the relational database 105. Information contained in the index instances may be used by the cloud-based search platform 150 to search the non-relational database 155 to pinpoint the records of interest in the relational database 105. FIG. 2A is a representative diagram of a record 200 in the relational database 105. Referring to FIG. 2A, each record 200 in the relational database 105 is composed of a plurality of attributes. Each attribute defines one or more pieces of data contained in the record 200. For example, in FIG. 1, Attribute1 may define the record ID of the record 200. The attributes contained in each record 200 may be distributed among a plurality of related tables 205, 210, 215, 220 in the relational database 105.

Tables in the relational database 105 may be related by primary or foreign keys that define the relationships. For example, in addition to being the record ID, Attribute 1 in Table 1 may be a primary key for Table 1. Attribute2 in Table 1 210 may be a foreign key for the Table 2 210. Attribute4 in Table 1 210 may be a foreign key for Table 3 215. Attribute7 in Table 2 210 may be a foreign key for Table 3 215. Attribute12 in Table 3 215 may be a foreign key for Table 4 220. Further, Attribute6 may be a primary key for Table 2 210, Attribute10 may be a primary key for Table 3 215, and Attribute13 may be a primary key for Table 4 220. In accordance with various aspects of the present disclosure, a subset of the total number of attributes contained in each of the plurality of records in the relational database 105 may be contained in a corresponding index instance in the non-relational database 155. One of ordinary skill in the art will appreciate that the data indicated for the above attributes is merely exemplary.

Figure 2B:
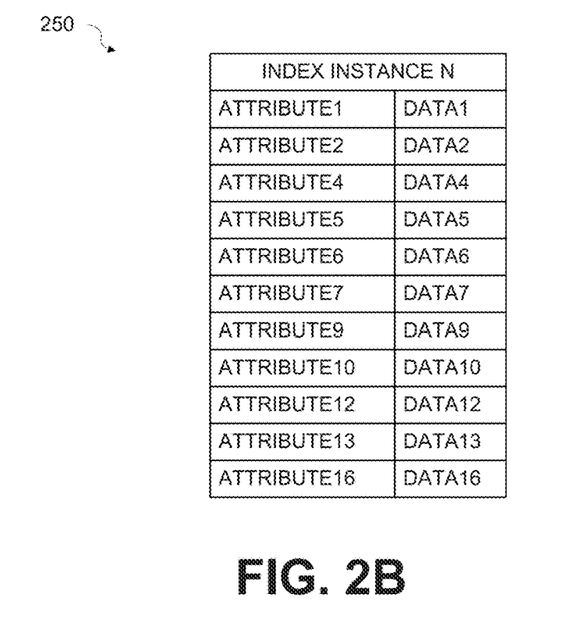
FIG. 2B is a representative diagram of an index instance according to various aspects of the present disclosure.

FIG. 2B is a representative diagram of an index instance 250 in accordance with various aspects of the present disclosure. The index instance 250 in the non-relational database 155 may reside in the cloud and may include a specified subset of attributes from the total number of attributes for the record 200 in the relational database 105. Referring to FIG. 2B, the index instance 250 includes Attributes 1, 2, 4-7, 9, 10, 12, 13, and 16 from the record 200 in the relational database 105. The specified attributes in the index instance 250 may be based on user requirements, i.e., frequent search attributes, for example, but not limited to, order type, order status, creation date, etc. Primary and foreign keys may be included in the specified attributes. The specified attributes included in the index instance 250 may be updated to add and/or remove attributed based, for example, on user requirements. The data corresponding to the attributes in the index instances in the non-relational database 155 may be synchronized with the data in the records of the relational database 105. One of ordinary skill in the art will appreciate that the attributes included in the index instance 250 of FIG. 2B are merely exemplary.

In accordance with various aspects of present disclosure, the attributes included in the index instance 250 may include a predefined set of search criteria and/or a predefined set of search summary results from a total number of attributes for each record maintained in the relational database 105. The predefined set of search criteria and/or the predefined set of search summary results may include all of the attributes in the index instance 250 as well as some additional attributes contained in the records maintained in the relational database 105. User requirements, for example, but not limited to, order type, order status, creation date, other frequent search attributes, etc., may determine a subset of attributes specified by a user as the search criteria for a search query. Similarly, user requirements may determine a subset of attributes specified by a user to be displayed in the search results summary. Primary and foreign keys may be included in the search criteria and/or search summary results, but are not required to be included.

Figure 3A:
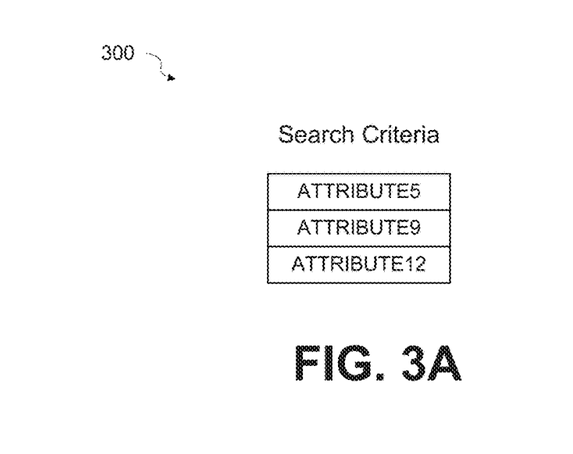
FIG. 3A is a representative diagram of search criteria specified in a search query according to various aspects of the present disclosure.

A subset of the predefined set of search criteria may be specified in a search query by a user. FIG. 3A is a representative diagram of search criteria 300 specified in a query in accordance with various aspects of the present disclosure. Referring to FIG. 3A, Attributes 5, 9, and 12 may be specified in the search query by a user. Attributes 5, 9, and 12 are a subset of Attributes 1, 2, 4-7, 9, 10, 12, 13, and 16 included in the index instance 250. One of ordinary skill in the art will appreciate that this subset of attributes is merely exemplary and that other attributes may be specified by a search query. In addition, one of ordinary skill in the art will appreciate that more or less than three attributes may be specified by a search query without departing from the scope of the present disclosure.

Figure 3B:
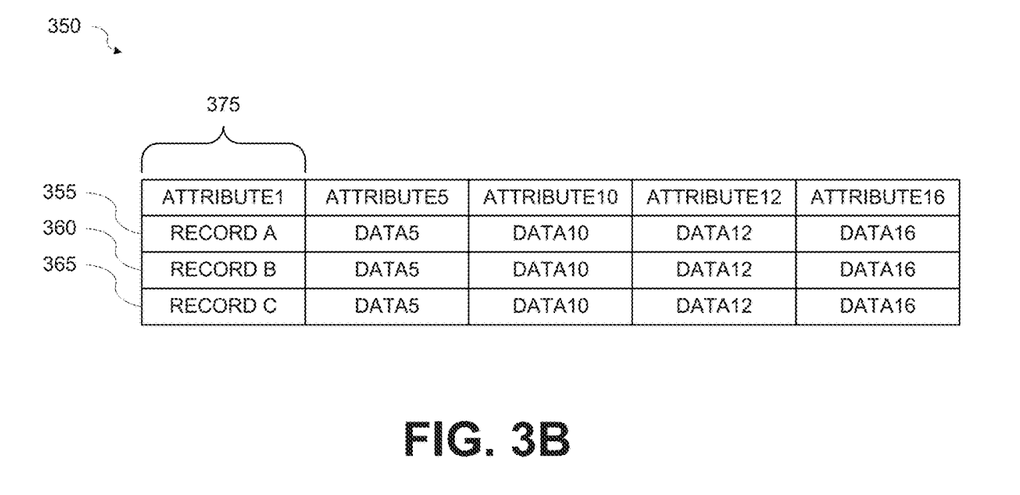
FIG. 3B is a representative diagram of search summary results returned in response to a search performed based on the search criteria of FIG. 3A according to various aspects of the present disclosure.

Similarly, a subset of the attributes in the predefined set of search summary results returned by a search of the non-relational database 155 may be specified by a user. The search summary results may be specified from the subset of attributes included in the index instance 250. The search summary results may include some, none, or all of the attributes specified in the search query. FIG. 3B is a representative diagram of search summary results 350 returned in response to a search performed based on the search criteria of FIG. 3A according to various aspects of the present disclosure.

Referring to FIG. 3B, the search summary results for each index instance matching the search query may return Attributes 1, 5, 10, 12, and 16 as specified by a user. Note that while Attribute9 was specified in the search criteria, Attribute9 was not specified by the user to be displayed in the search summary results. In the example of FIG. 3B, the search summary results include three index instances 355, 360, 365. Attribute1 of each index instance may correspond to a record ID of a record maintained in the relational database 105. After identifying appropriate records from the search of the index instances in the non-relational database 155, a user may directly query the relational database 105 for one or more of the specific record IDs.

Referring again to FIG. 1, the microservice 160 may be a server for the record queries. The microservice 160 may reside in the cloud. The microservice 160 may support existing search capabilities of the non-relational database 155 as well as future expansion to additional attributes and/or search criteria. Applications may communicate with the microservice 160 via an application programming interface, for example, but not limited to, a representational state transfer (RESTful) API. The microservice 160 may receive search queries based on specified search criteria and perform the requested search on the index instances in the non-relational database 155 in cloud-based search platform 150. Upon completion of the search of the index instances in the non-relational database 155, the microservice 160 may return the search results summary including the attributes specified by the user for the search results summary.

In accordance with various aspects of the present disclosure, if an attribute that is not included in the index instances is specified in a search query, an update script may pull the attribute and associated data in all the records of the relational database 105 and send new versions of index instances including the attribute and data to the cloud-based search platform 150. After the new versions of the index instances are stored in the non-relational database 155 in the cloud-based search platform 150, the microservice 160 may perform the search of the non-relational database 155 including the newly added attribute in the search criteria. Alternatively, if the attribute is one that is frequently changed in the relational database 105 (e.g., more frequently than the periodic update of the relational database), the attribute may be restricted from the search criteria. Accordingly, any search performed on the non-relational database 155 in the cloud-based search platform 150 would exclude the specific attribute.

As a further alternative, if an attribute that is not included in the index instances is specified in a search query, a search including attributes in the query that are available in the index instances may be performed on the non-relational database 155. A subsequent search of the records in the relational database 105 identified in the search summary results for the search of the non-relational database 155 may then be performed using only the record IDs and the missing attribute to limit the search.

In accordance with various aspects of the present disclosure, an application operating on the backend processor 110 may interface with the microservice 160 operating in the cloud. The backend processor 110 may receive a search request 111 (i.e., a query) from a client (e.g., a terminal, computer, mobile device, etc.) directed to the relational database 105. The search request 111 may include attributes from the records in the relational database 105 that are also included in the index instances in the non-relational database 155. If the backend processor 110 determines that the attributes in the search query are valid (i.e., the attributes are included in the index instances in the non-relational database 105), the backend processor 110 may reformat the search queries as instructions recognized by the API, for example, but not limited to, the RESTful API, for the microservice 160 and redirect the reformatted queries 112 to the microservice 160.

Upon completion of the search of the non-relational database 155 on the cloud-based search platform 150 by the microservice 160, the backend processor 110 may receive the search results summary from the microservice 160. The backend processor 110 may format the search results summary similarly to a form of the search results summary received from a direct search of the relational database 105. Additionally, the backend processor 110 may direct a specific attribute search 113, for example, but not limited to, a record ID, directly to the relational database 105 since such a specific attribute search may be conducted quickly on the relational database 105.

Further, the backend processor 110 may receive and process modification requests 115 from a client (e.g., a terminal, computer, mobile device, etc.). The modification request 115 may include for example, but not limited to, a request to create, update, or delete a record from the relational database 105. In addition to directing instructions 117 to the relational database 105 to cause the requested actions to be performed, the backend processor 110 may run the update script to reformat the modification request 115 as instructions recognized by the API, for example, but not limited to, the RESTful API, for the microservice 160, and redirect the reformatted modification request 116 to the microservice 160, thereby maintaining synchronization between the records in the relational database 105 and the index instances in the non-relational database 155. The backend processor 110 may cause the index instances in the non-relational database 155 to be synchronized with the record in the relational database 105 on a periodic basis, for example, every week or another time period.

Figure 4:
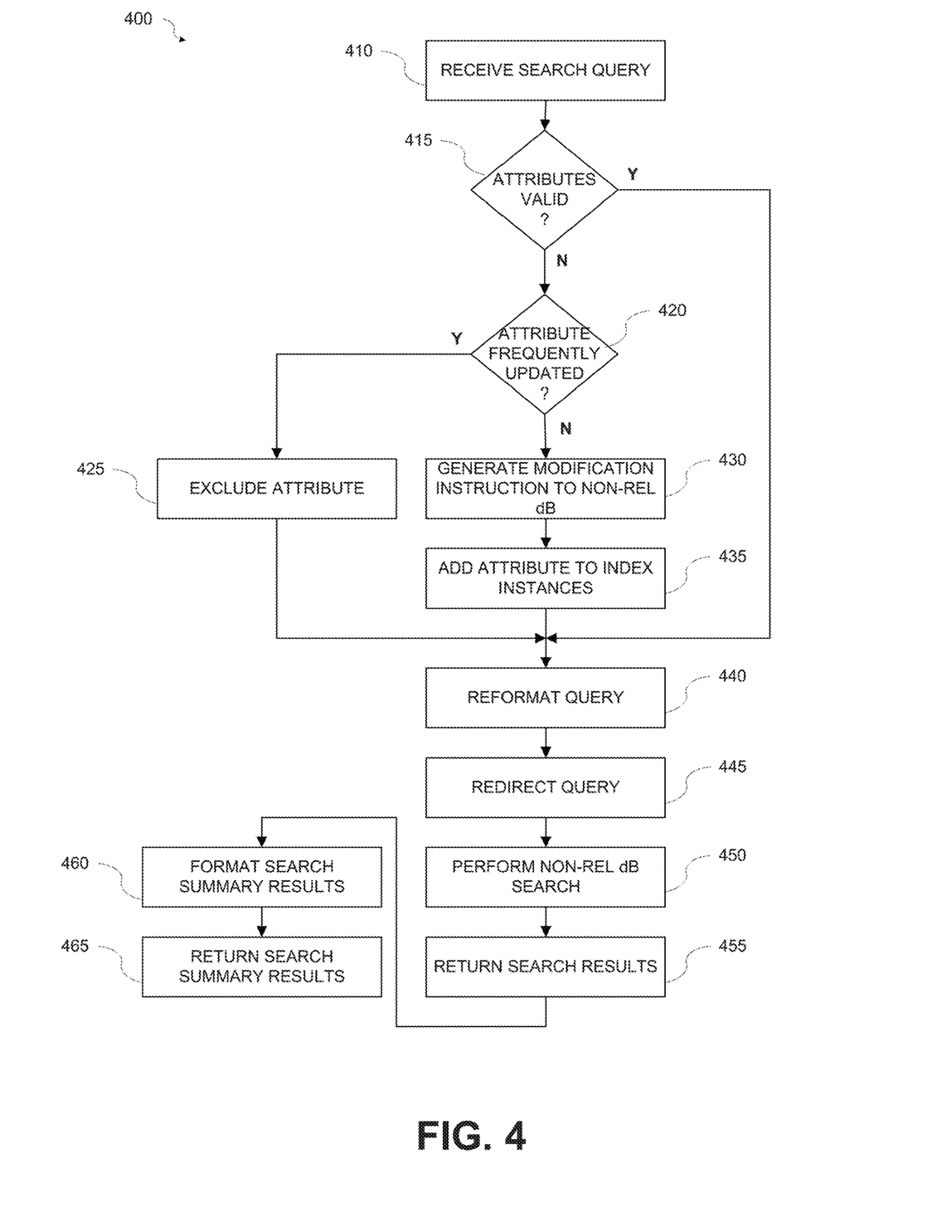
FIG. 4 is a flowchart of a method for scalable search using a microservice and cloud based search platform with records indexes according to various aspects of the present disclosure.

FIG. 4 is a flowchart of a method 400 for scalable search using a microservice and cloud based search platform with records indexes in accordance with various aspects of the present disclosure. Referring to FIG. 4, at block 410 a search query for the relational database 105 may be received. For example, an application operating on the backend processor 110 may receive a search query 111 from a client device. The search query 111 may include attributes corresponding to data contained in the relational database 105.

At block 415, the backend processor 110 may determine whether the attributes contained in the search query 111 are valid. For example, the backend processor 110 may determine whether the attributes in the search query 111 correspond to attributes contained in the index instances in the non-relational database 155. In response to determining that the attributes in the search query 111 are valid (415-Y), at block 440 the backend processor 110 may reformat the search query 111. For example, the backend processor 110 may reformat the search query 111 as instructions recognized by the API (e.g., the RESTful API) for the microservice 160. At block 445, the backend processor 110 may redirect the search query 111 to the microservice 160 for the non-relational database 105.

At block 450, the microservice 160 may cause a search of the index instances in the non-relational database 105 to be performed in accordance with the search query 111. At block 455, the microservice 160 may cause the search results to be returned to the backend processor 110. At block 460, the backend processor 110 may format the search results returned from the microservice 160. For example, the backend processor 110 may format the search results similarly to a form of the search results summary received from a direct search of the relational database 105.

Returning to block 415, in response to determining that the attributes in the search query 111 are not valid (415-N), at block 420 the backend processor 110 may determine whether the invalid attributes are suitable for adding to the index instances. For example, if the attributes are associated with data that is frequently updated in the relational database 105 (i.e., more frequently than a periodic update of the relational database 105), then it may not be suitable to add the attribute since the addition may trigger excessive updates. In response to determining that the invalid attributes are frequently updated in the relational database 105 (420-Y), at block 425 the backend processor 110 may exclude the invalid attributes from the search query 111.

In response to determining that the invalid attributes are not frequently updated in the relational database 105 (420-N), at block 430 the backend processor 110 may generate modification instructions to the non-relational database 155. At block 435, the backend processor 110 may cause the attributes to be added to the non-relational database 155. For example, the backend processor 110 may cause the attributes and corresponding data to be read from the relational database 105 and written to the corresponding index instances in the non-relational database 155.

At block 440 the backend processor 110 may reformat the search query. For example, the backend processor 110 may reformat the search query 111 as instructions recognized by the API (e.g., the RESTful API) for the microservice 160. At block 445, the backend processor 110 may redirect the search query 111 to the microservice 160 for the non-relational database 105.

At block 450, the microservice 160 may cause a search of the index instances in the non-relational database 105 to be performed in accordance with the search query 111. At block 455, the microservice 160 may cause the search results to be returned to the backend processor 110. At block 460, the backend processor 110 may format the search results returned from the microservice 160. For example, the backend processor 110 may format the search results similarly to a form of the search results summary received from a direct search of the relational database 105. At block 465, the backend processor 110 may return the search summary results to the client.

Figure 5:
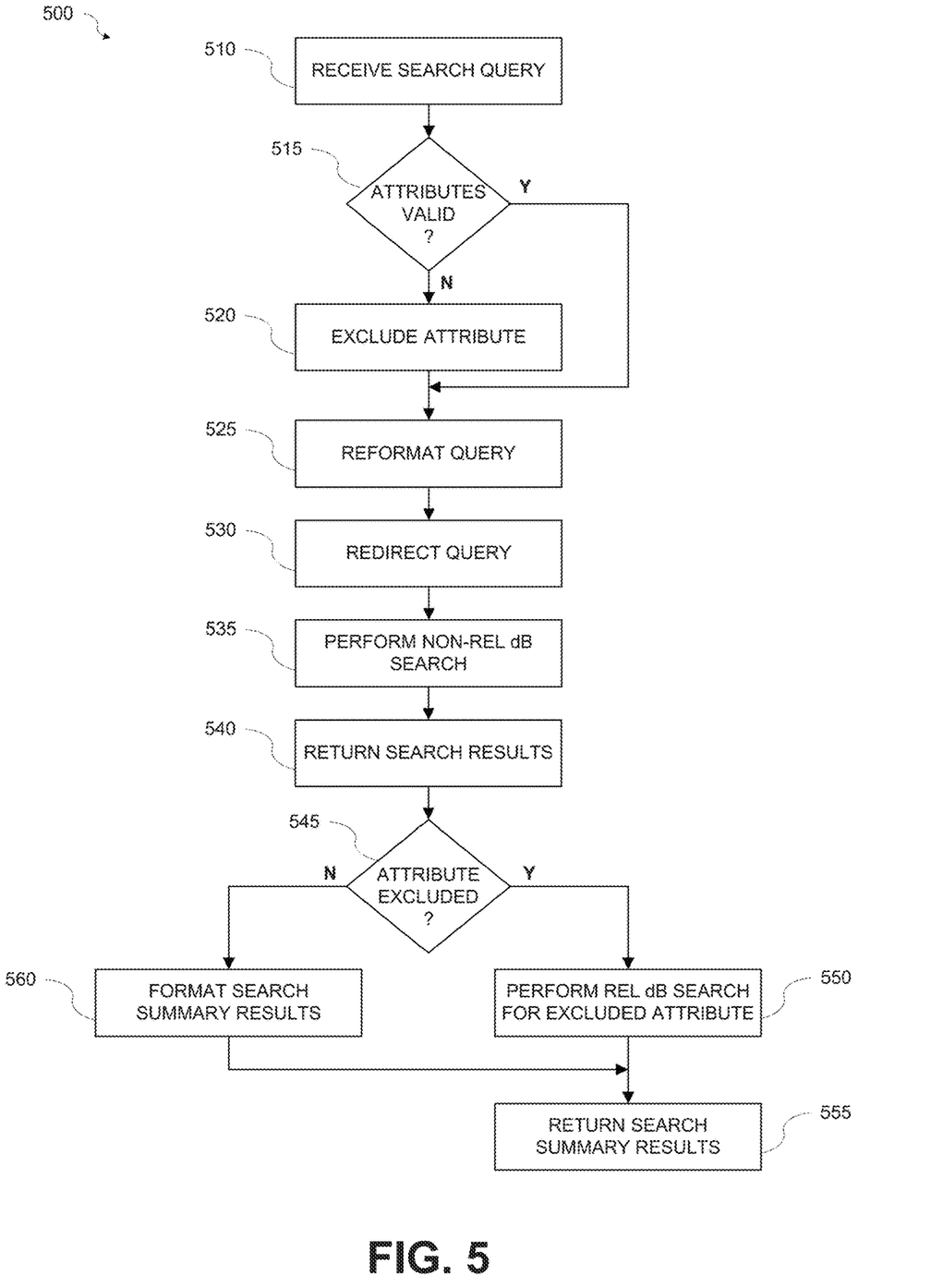
FIG. 5 is a flowchart of another method for scalable search using a microservice and cloud based search platform with records indexes according to various aspects of the present disclosure.

FIG. 5 is a flowchart of a method 500 for scalable search using a microservice and cloud based search platform with records indexes in accordance with various aspects of the present disclosure. Referring to FIG. 5, at block 510 a search query for the relational database 105 may be received.

At block 515, the backend processor 110 may determine whether the attributes contained in the search query 111 are valid. For example, the backend processor 110 may determine whether the attributes in the search query 111 correspond to attributes contained in the index instances in the non-relational database 155. In response to determining that the attributes in the search query 111 are not valid (515-N), at block 520 the backend processor 110 may exclude the invalid attribute from the search query 111. In response to determining that the attributes in the search query 111 are valid (515-Y), at block 525 the backend processor 110 may reformat the search query 111. For example, the backend processor 110 may reformat the search query 111 as instructions recognized by the API (e.g., the RESTful API) for the microservice 160. At block 530, the backend processor 110 may redirect the search query 111 to the microservice 160 for the non-relational database 105.

At block 535, the microservice 160 may cause a search of the index instances in the non-relational database 105 to be performed in accordance with the search query 111. At block 540, the microservice 160 may cause the search results to be returned to the backend processor 110. At block 545, the backend processor 110 may determine whether an attribute was excluded from the search query 111. In response to determining that an attribute was excluded from the search query 111 (545-Y), at block 550 the backend processor 110 may cause the relational database 105 to be searched for records included in the search summary results that match the attribute excluded from the search of the non-relational database 155. At block 555, the backend processor 110 may return the search summary results to the client.

In response to determining that an attribute was not excluded from the search query 111 (545-N), at block 560, the backend processor 110 may format the search results returned from the microservice 160. For example, the backend processor 110 may format the search results similarly to a form of the search results summary received from a direct search of the relational database 105. At block 555, the backend processor 110 may return the search summary results to the client.

The methods 400 and 500, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for searching for information maintained in a relational database platform, the method comprising:
   identifying a subset of attributes from a total number of attributes for each record in the relational database, wherein the subset of attributes includes a plurality of search attributes and a plurality of search summary attributes;
   extracting, via a processor, the subset of identified attributes from each record in the relational database;
   creating in a cloud-based non-relational database platform an index instance corresponding to each record in the relational database, wherein each index instance in the cloud-based non-relational database platform includes the subset of identified attributes indexed to a corresponding record in the relational database, wherein an attribute of each respective index instance in the non-relational database corresponds to a record ID of a respective record in the relational database;
   in response to receiving a search request that includes one or more search attributes, searching the index instances in the cloud-based non-relational database platform for corresponding records in the relational database, wherein the searching the index instances is responsive to determining that a first group of the one or more search attributes included in the search request correspond to a second group of attributes contained in the index instances in the cloud based non-relational database platform; and
   providing search results that include information from the corresponding records in the relational database, wherein the information is associated with the plurality of search summary attributes.

2. The method of claim 1, further comprising:
   determining whether a user-generated search request includes a record ID as a search request attribute;
   when the user-generated search request includes a record ID, searching the relational database; and
   when the user-generated search request includes the one or more search attributes, then generating the search request and directing the search request to the cloud-based non-relational database platform.

3. The method of claim 1 further comprising:
   identifying an additional search attribute from the total number of attributes for each record in the relational database;
   adding the additional search attribute to the plurality of search attributes and the subset of identified attributes; and modifying the index instances in the cloud-based non-relational database platform to add the additional search attribute.

4. The method of claim 1 further comprising:
identifying an additional search attribute from the total number of attributes for each record in the relational database;
determining whether the additional search attribute is an attribute updated more frequently than a periodic update of the relational database; and
in response to determining that the additional search attribute is an attribute updated more frequently than a periodic update of the relational database, maintaining the index instances in the cloud-based non-relational database platform to include the subset of identified attributes.

5. The method of claim 4, further comprising:
when the cloud-based non-relational database platform is not modified to add the additional search attribute, performing a search for records containing the additional search attribute in the relational database based on the search results from the search of the cloud-based non-relational database.

6. The method of claim 1, further comprising:
performing a subsequent search of the relational database based on record IDs returned in the search results summary for the search in the cloud-based non-relational database platform.

7. A system for searching for information maintained in a relational database platform, the system comprising:
a relational database platform configured to store a plurality of records containing a plurality of attributes;
a cloud-based non-relational database platform configured to store a plurality of index instances, each of the plurality of index instances corresponding to one of the plurality of records and containing a subset of attributes from a total number of attributes for each of the plurality of records, wherein the subset of attributes includes a plurality of search attributes and a plurality of search summary attributes, wherein an attribute of each of the plurality of index instances in the non-relational database corresponds to a record ID of a respective record in the relational database;
a backend processor configured to extract the subset of attributes from each record in the relational database; and
a microservice residing in the cloud configured to create in the cloud-based non-relational database platform the plurality of index instances;
wherein in response to receiving a search request that includes one or more search attributes, and in response to determining that the one or more search attributes correspond to attributes contained in the index instances in the cloud based non-relational database platform, the backend processor causes the microservice to search the index instances in the cloud-based non-relational database platform for corresponding records in the relational database; and
the microservice provides search results that include information from the corresponding records in the relational database, wherein the information is associated with the plurality of search summary attributes.

8. The system of claim 7, wherein the backend processor is further configured to:
determine whether a user-generated search request includes a record ID as a search request attribute;
in response to determining that the user-generated search request includes a record ID, search the relational database for a corresponding record; and
in response to determining that the user-generated search request includes the one or more search attributes other than the record ID, generate the search request and direct the search request to the microservice to search the cloud-based non-relational database platform.

9. The system of claim 7, wherein the backend processor is further configured to:
identify an additional search attribute from the total number of attributes for each record in the relational database;
add the additional search attribute to the plurality of search attributes and the subset of attributes; and
communicate instructions to the microservice to modify the index instances in the cloud-based non-relational database platform to add the additional search attribute.

10. The system of claim 7, wherein the backend processor is further configured to:
identify an additional search attribute from the total number of attributes for each record in the relational database;
determine whether the additional search attribute is an attribute updated more frequently than a periodic update of the relational database; and
in response to determining that the additional search attribute is an attribute updated more frequently than a periodic update of the relational database, communicate instructions to the microservice to maintain the index instances in the cloud-based non-relational database platform to include the subset of add the additional search attributes.

11. The system of claim 10, wherein the backend processor is further configured to:
determine whether the cloud-based non-relational database platform is modified to add the additional search attribute, and
in response to determining that the cloud-based non-relational database platform is not modified to add the additional search attribute, perform a search for records containing the additional search attribute in the relational database based on the search results communicated by the microservice to the backend processor from the search of the cloud-based non-relational database.

12. The system of claim 7, wherein the backend processor is further configured to:
perform a subsequent search of the relational database based on record IDs returned in the search results summary by the micro service for the search in the cloud-based non-relational database platform.

13. A method for searching for information maintained in a relational database, the method comprising:
creating in a non-relational database in a cloud-based search platform an index instance corresponding to each record in the relational database, wherein each index instance in the non-relational database includes a subset of identified attributes from attributes for each record, each index instance indexed to a corresponding record in the relational database, wherein an attribute of each respective index instance in the non-relational database corresponds to a record ID of a respective record in the relational database;
receiving a search request for the relational database, the search request including one or more attributes from the subset of identified attributes;

redirecting, via a processor, the search request to the non-relational database;
responsive to determining that the one or more attributes contained in the search request correspond to attributes contained in the index instances in the cloud based non-relational database platform, performing a search in the non-relational database based on the attributes included in the search request; and
returning a search results summary from the search in the non-relational database,
wherein the search results summary includes record IDs and attributes for one or more index instances corresponding to one or more records in the relational database.

14. The method of claim 13, further comprising:
preselecting from the subset of identified attributes the one or more attributes returned in the search results summary.

15. The method of claim 13, wherein one or more of the attributes returned in the search results summary are different than the attributes included in the search request.

16. The method of claim 13, further comprising:
reformatting the redirected search request to provide instructions compatible with the non-relational database in the cloud-based search platform.

17. The method of claim 13, further comprising:
formatting the search results summary returned from the non-relational database similarly to search results returned from a search of the relational database.

18. The method of claim 13, further comprising:
performing a subsequent search of the relational database based on the record IDs returned in the search results summary for the search in the non-relational database.

19. The method of claim 13, further comprising:
identifying, from the attributes for the records in the relational database, an additional search attribute not included in the subset of identified attributes; and
modifying the index instances in the non-relational database to include the additional search attribute.

20. The method of claim 13, further comprising:
identifying, from the attributes for the records in the relational database, an additional search attribute not included in the subset of identified attributes; and
performing a subsequent search in the relational database for records containing the additional search attribute in the relational database based on the search results summary from the non-relational database search.

* * * * *